Patented July 8, 1947

2,423,470

UNITED STATES PATENT OFFICE 2,423,470

ALKYLATION OF AN ACYCLIC ORGANIC COMPOUND WITH AN ALKYLATION AGENT USING HYDROGEN FLUORIDE AS CATALYST

Joseph H. Simons, State College, Pa., assignor to E. I. du Pont de Nemours & Company, Wilmington, Del., a corporation of Delaware No Drawing. Application July 27, 1938, Serial No. 221,609

13 Claims. (Cl. 260—677)

The present invention relates to a method of synthesis of organic chemical compounds. More particularly, it relates to the synthesis of organic compounds by the use of hydrogen fluoride as the condensing agent.

It has been found that hydrogen fluoride is an effective catalyzing medium for methods of synthesis in which organic compounds may be made to combine with other organic compounds. In a more specific aspect, the invention deals particularly with the combining of compounds having reactive chain structures with compounds having reactive ring structures.

By reactive chain structures are meant those portions of organic compounds which are aliphatic in structure and which contain an olefinic linkage or a reactive group such as a halide or an alcohol radical. Examples of such compounds are the halides such as butyl and propyl chloride, the olefins such as propylene and isobutylene, and the alcohols such as butyl alcohol.

By reactive ring structures are meant those portions of organic compounds which are cyclic in structure and in which the cyclic structure is either aromatic or unsaturated, or contains a reactive group such as a halogen atom or a hydroxyl radical or is under strain. Examples of such compounds are benzene, phenol, toluene, naphthalene, cyclo propane, cyclo hexene, esters of furoic acid, etc. The invention will be more fully understood from the following description.

The classes of organic compounds with which the present catalytic process is concerned may be referred to generally as reactive organic compounds, this term embracing those organic compounds, both aliphatic and cyclic, which contain in their molecules a replaceable hydrogen atom, or a replaceable negative group, or which, in the presence of hydrogen fluoride, form a replaceable negative group within the compound.

A number of processes for condensation of organic compounds have been discovered since the introduction of the Friedel and Crafts reaction process. Many inorganic compounds have been utilized to catalyze these reaction processes and included among these compounds are oxygen containing acidic substances such as sulfuric acid and phosphoric acid, and compounds of metals such as aluminum chloride and boron trifluoride.

The catalysts employed in the Friedel-Crafts processes are also effective for polymerization. It therefore quite often occurs that polymerized compounds are obtained as by-products while carrying on the Friedel-Crafts reaction process. By polymerization processes, organic molecules of the same type or class are united with the aid of catalysts. Not only are aliphatic molecules united, but additionally, cyclic compounds may be united. Accordingly, when the condensation of cyclic compounds with aliphatic compounds is attempted, using Friedel-Crafts reagents, the cyclic compounds often combine with each other with the formation of tars and resin by polymerization; additionally, the aliphatic compounds may polymerize to produce heavier molecules of aliphatic compounds. Thus, though it may be desired to form condensed cyclic aliphatic compounds, the final product obtained will consist of these plus polymerized ring compounds and polymerized aliphatic compounds. The yield of the desired products is therefore low and greatly adulterated with undesired tars and resins.

By employing hydrogen fluoride as a catalyzing medium, reaction may be effected between the compounds above defined under such conditions that the formation of tars and resins is very small, polymerization is reduced to a minimum and the yield of very pure desired products is high. This result is of the highest practical importance.

One of the objects of this invention is to provide a method for combining organic molecules through the reaction between reactive structures of such molecules. Another object is to provide a method of reaction giving high yields of high purity products. A further object is to provide a method which is relatively free from polymerization and the resultant formation of obnoxious by-products such as tars and resins. Still another object of this invention is to provide a reagent for these reactions that is both convenient and economical to use. Other objects of this invention will be apparent to those skilled in the art from the following description of this invention.

An advantageous application of this invention relates to the reaction of compounds containing reactive ring structures, such as benzene, toluene, phenol, naphthalene, anthracene, cyclo propane, cyclo hexene and others, with compounds containing reactive chain structures such as organic halides, olefins, and alcohols, by the use of hydrogen fluoride substantially free from water. More particularly, it has been found that the reaction between the primary, secondary and tertiary halides such as tertiary butyl chloride, isopropyl chloride, normal propyl bromide, tertiary amyl chloride, and others, with other of the above mentioned compounds having reactive structures, may be effected when hydrogen fluoride is employed as the catalyzing medium. The reaction of organic compounds of either the ring or chain type and containing a reactive halogen, with other aromatic, olefinic and unsaturated compounds of either the ring or chain type is a highly important reaction in organic synthesis and the discovery that hydrogen fluoride will catalyze such reactions is believed to be a new development in this art.

It has also been found that olefines such as propylene, isobutylene, pentene 2, trimethylethylene and cyclohexene may be made to condense with reactive ring structure compounds through the use of hydrogen fluoride under conditions to be described. It has further been found that aliphatic alcohols such as tertiary butyl alcohol and others, may be condensed with reactive ring compounds under the conditions of this reaction. It has also been found that other types of compounds containing reactive ring structures, such as the esters of furoic acid and cyclohexene, can be caused to react with compounds containing reactive chain structures by the use of the described reagent.

Hydrogen fluoride has been found to be particularly suitable as a catalyzing medium for these reactions. Other hydrogen halides such as hydrogen chloride and hydrogen bromide are not effective in promoting these reactions. The properties of hydrogen fluoride make it a convenient catalyzing medium. Hydrogen fluoride is a liquid material, not readily frozen and having a boiling point near room temperature. It is safely stored in iron vessels at pressures not much greater than atmospheric. It can therefore be economically added to the reaction vessel in either the liquid or gaseous state through ordinary valve controlled pipes. Because it is not converted into solid or high boiling substances during the reaction, it can readily be removed from the reaction vessel after the reaction is completed, by driving it off either as a gas or liquid.

The reaction is in general effected by the following procedure.

Hydrogen fluoride is first distilled into a copper flask which is kept cooled to a temperature of approximately 0° C. To this is then added an excess of one of the organic compounds. The hydrogen fluoride and the organic compound are thoroughly mixed by means of a mechanical stirrer. Next, there is added the other compound employed in quantity sufficient to effect the desired degree of reaction, with constant stirring. The reaction process is allowed to continue to completion with constant stirring after which the reaction mixture is poured onto ice. Excess acid is neutralized by the addition of sodium bicarbonate, after which the oil and water layers are separated and the oil layer dried over potassium carbonate for about ten to fifteen hours. The oil mixture is next fractionally distilled to secure different boiling fractions corresponding to different reaction products.

It will be noted that the processes of the present invention are in general carried on at 0° C. and at one atmosphere pressure. The combination of a large number of organic compounds has been found to be possible by this process by varying the temperature and pressure conditions of the reaction. It is not necessary that the hydrogen fluoride employed be entirely anhydrous providing it is substantially free from water. The presence of impurities in the hydrogen fluoride employed is not detrimental as has been found by the use of a commercial grade of hydrogen fluoride. A particular advantage of this reaction process is the fact that no heat is required. Another advantage is that different degrees of reaction may be effected by varying the proportions of the reagents employed. This therefore makes necessary a somewhat close control of quantities of starting materials as a condition of the reaction.

The following examples are illustrative of reaction processes which have been carried out in accordance with the present invention using various organic compounds.

EXAMPLE 1

Forty parts of hydrogen fluoride were distilled into a copper flask kept in ice and to this was added 240 parts of benzene. The hydrogen fluoride and benzene were well mixed by stirring, after which there was added 95 parts of tertiary butyl chloride slowly and with stirring. After the reaction process was completed and the reaction products had been treated as above described, the excess benzene in the oil fraction was removed by distillation. Further distillation yielded two products, tertiary butyl benzene boiling at 167–170° C., and para-di-tertiary butyl benzene melting at 76–77° C. The known boiling point of tertiary butyl benzene is 170° C. and the known melting point of para-di-tertiary butyl benzene is 78° C. Approximately 14 parts of the tertiary butyl benzene and 51 parts of the para-di-tertiary butyl benzene were obtained from the reaction.

The identity of these compounds was verified by converting the tertiary butyl benzene into its acetamino derivative, which melted at 169–170° C. The known melting point of the acetamino derivative of tertiary butyl benzene is 170° C. The para-di-tertiary butyl benzene was converted by nitration into its di-nitro derivative which melted at 188° C. The known melting point for di-nitro di-tertiary butyl benzene is 190° C.

EXAMPLE 2

Seventy parts of tertiary butyl chloride was slowly added with continual stirring to a mixture of 25 parts of hydrogen fluoride and 185 parts of toluene in the apparatus and by the method above described. This reaction was allowed to proceed for approximately 12 hours, after which the reaction products were neutralized and dried as above described. Excess toluene was then removed and the remaining solution distilled. Approximately 75 parts of para-tertiary butyl toluene boiling at 72–72.5° at 12 millimeters pressure, were obtained. At atmospheric pressure, this material boiled at 188°. The known boiling point for this compound is 191° C. This compound was verified as para-tertiary butyl toluene by conversion into its benzoic acid derivative which melted at 163.5–164.5°. The known melting point for para-tertiary butyl benzoic acid is 164° C.

EXAMPLE 3

To a mixture of 40 parts of hydrogen fluoride and 235 parts of benzene were added 60 parts of tertiary amyl chloride. In the apparatus and by the method above described, the reaction process was allowed to proceed for approximately 20 hours, after which the reaction mixture was treated as above described and the excess benzene removed. Upon distillation at 12 millimeters pressure, there was obtained 25 parts of tertiary amyl benzene boiling at 71–72° C. under this pressure. Its boiling point at atmospheric pressure was 187° C., which is the known boiling point of that compound. When this compound was converted into its acetamino derivative, it had a melting point of 139–140.5° C. The known melting point of the acetamino derivative of tertiary amyl benzene is 142° C. Further distillation yielded a compound having the properties of para-di-tertiary amyl benzene.

EXAMPLE 4

To a mixture of 75 parts of hydrogen fluoride and 235 parts of benzene at a temperature of 0° C., in a copper flask, there was added with continual stirring, an indefinite quantity of propylene prepared by dehydrating propyl alcohol with sulfuric acid. The reaction process was allowed to proceed for 2½ hours after which the mixture was poured upon ice, neutralized, the oil and water layers separated, the oil layer dried over potassium carbonate, and the excess benzene removed by distillation. Further distillation yielded 13 parts of an iso-propyl benzene having a boiling point of 149–150° C. The known boiling point for iso-propyl benzene is 152° C. The iso-propyl benzene was converted into its acetamino derivative which had a melting point of 105–105.5°, in comparison with the known melting point of this derivative of 106° C. The residue remaining after the distillation of the iso-propyl benzene yielded fractions boiling around 200° C. It is believed that these fractions represented the poly-iso-propylated benzenes.

EXAMPLE 5

Approximately 30 parts of iso-butylene, prepared by de-hydrating tertiary butyl alcohol with sulfuric acid, was added to approximately 40 parts of hydrogen fluoride and 235 parts of benzene slowly and with constant stirring at a temperature of 0° C. After about 3 hours, the mixture was poured over ice, the oil and water layers separated, and the excess of benzene removed from the oil layer. Distillation yielded about 35 parts of a liquid fraction boiling at 167–168° C., and having the properties of tertiary butyl benzene, which boils at 170° C. The residue from the distillation, when purified, yielded 30 parts of a solid that melted at 76.5–77.5° C., indicating that this material was a di-tertiary butyl benzene. The known melting point of that compound is 78–78.5° C.

When the tertiary butyl benzene of this example was converted to its acetamino derivative, the melting point was determined as 168–169.5° C., thus corresponding closely to the known melting point of 170° C. for the acetamino derivative of tertiary butyl benzene.

EXAMPLE 6

Reaction between pentene-2 and benzene was effected by adding about 36 parts by weight of pentene-2 to a mixture of 20 parts of hydrogen fluoride in 240 parts of benzene. The reaction process was allowed to continue for about 3 hours with constant stirring at a temperature of 0° C., after which the mixture was poured over ice and neutralized, the oil and water layers separated, the oil layer dried over potassium carbonate, and the excess benzene removed from the oil layer. Distillation under a pressure of 13–17 millimeters yielded about 35 parts of betaphenylpentane boiling at 74–80° C. Physical tests upon this compound, such as index and density measurements, as well as chemical tests such as boiling points and melting points of various derivatives, indicated that this compound was the betaphenylpentane and not the gamma compound. The acetamino derivative of this compound melted at 119–120° C.

EXAMPLE 7

A reaction between benzene and the olefine, trimethylethylene, was carried out by adding 75 parts of the latter to a mixture of 240 parts of benzene and 100 parts of hydrogen fluoride. The reaction was allowed to proceed with constant stirring for about 3½ hours, after which the reaction product was treated in the manner above described. Upon distillation at 12 millimeters pressure of the oil layer from which the benzene had been removed, there was obtained about 32 parts of tertiary amyl benzene boiling at 71–72° C. At this pressure, the known boiling point for tertiary amyl benzene is 78° C. When converted to its acetamino derivative, the melting point was found to the 140–142°, corresponding with a known melting point of 142° C. There was additionally obtained about 70 parts of a di-tertiary amyl benzene boiling at 130–131° C. at 12 millimeters pressure. The boiling point of this latter compound at atmospheric pressure was 262–264° C. which is in agreement with the known boiling point for di-tertiary amyl benzene of 262–265° C.

EXAMPLE 8

A reaction between an alcohol and a ring compound was effected by adding about 75 parts of tertiary butyl alcohol to 55 parts of hydrogen fluoride in 240 parts of benzene under the usual reaction conditions, except that the alcohol was added all at one time in order to avoid freezing. The reaction process was allowed to proceed for about 4 hours. After the usual treatment of the reaction mixture, the oil layer was distilled. The residue from the distillation was found to be di-tertiary butyl benzene having a melting point of 78–78.5° in agreement with the known melting point for this material.

EXAMPLE 9

The reaction between a normal bromide and benzene was effected by the following procedure. A mixture of 15 parts of normal propyl bromide and 40 parts of benzene was placed in a copper bomb tube and 10 parts of hydrogen fluoride added. The bomb was then sealed and heated at 100° C. for 24 hours. The bomb was then cooled in ice, carefully opened, and the mixture removed. On distillation 5 parts of monopropyl benzene boiling 150–153° and 3 parts of polypropyl benzenes were obtained.

EXAMPLE 10

Illustrative of the reaction between an alkyl halide and naphthalene, 128 parts of naphthalene dissolved in 500 parts of carbon tetrachloride was added to 100 parts of hydrogen fluoride. One hundred twenty-five parts of tertiary butyl chloride was added with stirring over a three hour period. The reaction was allowed to run for 23 hours at a temperature of 0° C. and another 30 hours at about 20–25°. After the usual separation and purification, three products were obtained. Seventy-six parts of monotertiary butyl naphthalene, which boiled at 142–143° C. at 14 mm. of pressure and which formed a picrate which melted at 95–96° C., was the major product. Two di-tertiary butyl naphthalenes were the other products, 40 parts of one, which melted at 79–82°, and 15 parts of the other, which melted at 145–146° C.

EXAMPLE 11

This example illustrates a reaction involving a compound containing a reactive ring structure of an entirely different type than benzene and its derivatives. The compound contains oxygen in the ring.

To 97 parts of hydrogen fluoride were added 84 parts of ethyl furoate dissolved in 200 parts of carbon tetrachloride. Tertiary butyl chloride was added with stirring. The reaction did not proceed readily at 0° C., but did proceed for 48 hours at room temperature. When hydrogen chloride was no longer generated in the reaction flask, the products were treated in the usual manner. Distillation gave 60 parts of tertiary butyl ethyl furoate which boiled at 117.5° at 16 mm. Its refractive index was 1.4749–1.4750 and upon saponification formed an acid which melted at 105–105.5° C.

EXAMPLE 12

The reaction between two compounds containing different reactive chain structures is illustrated by this example. Ninety-two parts of tertiary butyl chloride were added to 45 parts of hydrogen fluoride in a copper reaction flask at 0° C. Seventy parts of trimethylethylene were then added over a period of two hours with stirring. The reaction mixture was stirred for one hour longer, then poured into ice, the acid neutralized, and the oil layer separated and dried. On distillation, a fraction 20 parts by weight was separated, which boiled at 63–65° C. at 19 mm. of pressure which had a refraction index 1.4279–1.4315. This was the desired product, one or more of the nonenes.

EXAMPLE 13

This example illustrates a synthesis using hydrogen fluoride to cause one compound containing a reactive ring structure to react with another compound containing a different reactive ring structure.

Two hundred parts of benzene was mixed with 120 parts of hydrogen fluoride at 0° C. and then 50 parts of cyclohexene was slowly added over a period of 4½ hours. Stirring was continued for 8 hours longer. Distillation yielded 59 parts of cyclohexyl benzene boiling at 235–240° C. Four parts of a higher boiling material, probably dicyclohexyl benzene, was also formed.

The results of the above examples may be tabulated as follows:

*Table I*

| Example | Compound | Source | Boiling Point | Boiling Point Known Compound | Melting Point Acetamino Compound | Melting Point Known Acetamino Compound |
|---|---|---|---|---|---|---|
| | | | | | Degrees | Degrees |
| 1 | T-butylbenzene | t-butyl chloride and $C_6H_6$ | 167–170° | 167° | 169–170 | 170 |
| 1 | P-di t-butyl benzene | t-butyl Cl and $C_6H_6$ | 76–77°[1] | 78–78.5°[1] | [2] 188 | [2] 190 |
| 2 | P t-butyl-toluene | t-butyl Cl and toluene | 188° | 191° | [3]163.5–164.5 | [3] 164 |
| 3 | T-amyl-benzene | t-amyl Cl and $C_6H_6$ | 187° | 187° | 139–140.5 | 142 |
| 4 | I-propyl-benzene | propylene and $C_6H_6$ | 149–150° | 152° | 105–105.5 | 106 |
| 5 | T-butyl-benzene | isobutylene and $C_6H_6$ | 167–168° | 167° | 168–169.5 | 170 |
| 5 | Di t-butyl-benzene | isobutylene and $C_6H_6$ | 76.5–77.5°[1] | 78–78.5°[1] | | |
| 6 | Beta phenylpentane | pentene-2 and $C_6H_6$ | 74° at 12 mm | 73° at 12 mm. | 119–120 | |
| 7 | T-amylbenzene | trimethyl-ethylene and $C_6H_6$ | 71–72° at 12 mm | 78° at 12 mm. | 140–142 | 142 |
| 7 | Di-t-amylbenzene | trimethyl-ethylene and $C_6H_6$ | 262–264° | 262–265° | | |
| 8 | Di t-butylbenzene | t-butyl alcohol and $C_6H_6$ | 78–78.5°[1] | 78–78.5°[1] | | |
| 9 | Mono-propyl benzene | n-propyl bromide and benzene | 150–153° | 158° | | |
| 9 | Poly-propyl benzenes | n-propyl bromide and benzene | | | | |
| 10 | Mono-tertiary butyl naphthalene. | t-butyl chloride and naphthalene | 142–143° at 14 mm | | [4] 95–96 | (4) |
| | Di-tertiary butyl naphthalene | t-butyl chloride and naphthalene | 79–82°[1] | | | |
| | Di-tertiary butyl naphthalene | t-butyl chloride and naphthalene | 145–146°[1] | | | |
| 11 | Tertiary butyl ethyl furoate | t-butyl chloride and ethyl furoate | 117.5° at 16 mm | | | |
| 12 | a nonene | t-butyl chloride and trimethyl ethylene. | 63–65° at 19 mm | | | |
| 13 | cyclohexyl benzene | benzene and cyclohexene | 235–240° | | | |

Temperatures—centigrade.
[1] Read as melting point instead of boiling point.
[2] Dinitro derivative, not the acetamino.
[3] Melting point of P t-butylbenzoic acid.
[4] Melting point of picrate compound.

Examples 1, 2 and 3 indicate that by the use of hydrogen fluoride as a catalyst, a reaction may be effected between organic compounds having a reactive ring structure and the halide type of reactive chain structure compounds. Example 2 is illustrative of the use of a substituted benzene, toluene. Examples 4 to 7, inclusive, are illustrative of reaction processes carried on between reactive ring structure compounds and olefinic type reactive chain structure compounds. Example 8 is illustrative of a reaction process employing an alcohol type reactive chain structure compound and a reactive ring structure compound. Example 9 shows the use of a normal halide, shows the use of a bromide instead of a chloride, and shows the use of higher temperatures than employed in the other reactions. Example 10 illustrates the use of naphthalene as the reactive ring compound. Example 11 shows that the reaction is useful for non-benzenoid ring compounds. It also shows that the reaction is operative on organic compounds containing oxygen both in the ring and in a side chain. Example 12 further illustrates the general usefulness of the reaction. In this example, one reactive chain compound, a halide, is made to react with another reactive chain compound, an olefin. Example 13 shows the reaction of one compound containing a reactive ring structure with another compound containing a different reactive ring structure.

The reaction of benzene with cyclo-propane further illustrates the reaction of one reactive ring compound with another reactive ring compound. The reaction of cyclohexene with tertiary butyl chloride further illustrates the use of the reaction on non-benzenoid ring compounds.

It is thus evident that there are made possible through the medium of hydrogen fluoride as the effective catalyst chemical condensation reactions between organic compounds, both aliphatic and cyclic, which contain in their molecules a replaceable hydrogen atom, and organic compounds which contain in their molecules a replaceable negative group or which, in the presence of hydrogen fluoride, form a replaceable negative group within the compound.

In addition to the above examples, experiments have indicated that the reaction may be effected with many other types of organic compounds. Propyl naphthalene was obtained by the reaction between propylene and naphthalene, tertiary butyl phenol was obtained by a reaction between tertiary butyl chloride and phenol, higher molecular weight olefines were obtained by a reaction between cyclohexene and tertiary butyl chloride, etc., all by means of the use of hydrogen fluoride as the catalyst.

It will be understood that the chemical condensation reactions disclosed herein are clearly distinguished from those reactions involving the union of molecules having identical molecular weight and similar atomic structure. Therefore, the term "chemical condensation," as used herein, as well as the term "alkylation," is intended to define those reactions in which the union of compounds is effected through a single common bond, and clearly distinguishes from "polymerization," either co- or cross-polymerization.

It is thus apparent that this reaction is adaptable to many kinds of organic compounds. There is demonstrated the wide utility of hydrogen fluoride to catalyze reactions between organic compounds having reactive ring and chain structures.

The term "alkylation" as here employed is to be understood as embracing those chemical reactions in which there is effected the introduction of one or more acyclic side chains into an organic nucleus, e. g., the union of one or more alkyl groups with an organic compound.

It is to be expressly understood that the foregoing description and examples are illustrative only and that this invention is not to be limited beyond the scope of the subjoined claims.

Having thus described the invention, I claim:

1. A method of alkylation which comprises contacting an acyclic organic compound containing a replaceable hydrogen atom with an alkylating agent in the presence of hydrogen fluoride as the sole effective alkylation catalyst.

2. A process for the production of alkyl derivatives of acyclic hydrocarbons which comprises contacting said acyclic hydrocarbons with an acyclic organic compound capable of alkylating said acyclic hydrocarbons under alkylating conditions in the presence of hydrogen fluoride as the sole effective alkylation catalyst.

3. A process for the production of alkyl derivatives of acyclic hydrocarbons which comprises contacting said acyclic hydrocarbons with an alkylation agent in the presence of hydrogen fluoride as the sole effective alkylation catalyst.

4. A process for the production of alkyl derivatives of acyclic hydrocarbons which comprises contacting said acyclic hydrocarbons with an organic halide in the presence of hydrogen fluoride as the sole effective alkylation catalyst.

5. A process for the production of alkyl derivatives of acyclic hydrocarbons which comprises contacting said acyclic hydrocarbons with an organic alcohol in the presence of hydrogen fluoride as the sole effective alkylation catalyst.

6. A process for the production of alkyl derivatives of acyclic hydrocarbons which comprises contacting said acyclic hydrocarbons with an organic olefin in the presence of hydrogen fluoride as the sole effective alkylation catalyst.

7. An alkylation method of organic synthesis which comprises contacting hydrogen fluoride, an acyclic organic compound, and an organic compound containing a replaceable negative group or which in the presence of hydrogen fluoride, forms such a group, to effect alkylation of said acyclic organic compound through the medium of hydrogen fluoride as the sole effective catalyst.

8. An alkylation method which comprises contacting hydrogen fluoride, an open-chain hydrocarbon containing a replaceable hydrogen atom, and an open-chain hydrocarbon containing a replaceable negative group or which in the presence of hydrogen fluoride forms such a group, to effect alkylation of the first of said organic compounds through the medium of hydrogen fluoride as the effective catalyst.

9. A process which comprises reacting two compounds containing different reactive chain structures in the presence of hydrogen fluoride as the sole effective catalyst.

10. A process which comprises reacting an open-chain hydrocarbon containing a replaceable hydrogen atom with an open-chain hydrocarbon containing a replaceable negative group in the presence of hydrogen fluoride substantially free from water as the sole effective catalyst.

11. A process which comprises reacting two hydrocarbons containing different reactive chain structures, one of which is an olefine, in the presence of hydrogen fluoride substantially free from water as the sole effective catalyst.

12. A process which comprises reacting two hydrocarbons containing different reactive chain structures, one of which is propylene, in the presence of hydrogen fluoride substantially free from water as the sole effective catalyst.

13. A process which comprises reacting two hydrocarbons containing different reactive chain structures, one of which is propylene, in the presence of hydrogen fluoride substantially free from water as the sole effective catalyst, said process being operated at a pressure of substantially one atmosphere.

JOSEPH H. SIMONS.

REFERENCES CITED

The following references are of record in the file of this patent:

UNITED STATES PATENTS

| Number | Name | Date |
|---|---|---|
| 1,908,190 | Schollkopf et al. | May 9, 1933 |
| 1,898,627 | Hofmann et al. | Feb. 21, 1933 |
| 1,933,434 | Hofmann et al. | Oct. 31, 1933 |
| 1,989,425 | Otto et al. | Jan. 29, 1935 |
| 1,965,952 | Zorn | July 10, 1934 |
| 2,145,905 | Weinmayr | Feb. 7, 1939 |
| 2,174,118 | Calcott et al. | Sept. 26, 1939 |

FOREIGN PATENTS

| Number | Country | Date |
|---|---|---|
| 492,840 | Germany | Feb. 27, 1930 |
| 501,725 | Germany | July 4, 1930 |
| 503,936 | Germany | July 30, 1930 |
| 513,414 | Germany | Nov. 27, 1933 |
| 809,175 | France | Dec. 3, 1936 |